United States Patent
Perin

(10) Patent No.: US 9,014,226 B2
(45) Date of Patent: Apr. 21, 2015

(54) CRYSTAL LASER COMPRISING A SYSTEM FOR COOLING THE CRYSTAL WITH A FLUID

(71) Applicant: Commissariat a l'Energie Atomique at aux Energies Alternatives, Paris (FR)

(72) Inventor: Jean-Paul Perin, Seyssins (FR)

(73) Assignee: Commissariat a l'Energie Atomique et aux Energies Alternatives (FR)

( * ) Notice: Subject to any disclaimer, the term of this patent is extended or adjusted under 35 U.S.C. 154(b) by 0 days.

(21) Appl. No.: 14/291,718

(22) Filed: May 30, 2014

(65) Prior Publication Data

US 2015/0016480 A1    Jan. 15, 2015

(30) Foreign Application Priority Data

Jul. 10, 2013   (FR) ...................... 13 56767

(51) Int. Cl.
| | | |
|---|---|---|
| *H01S 3/04* | (2006.01) | |
| *H01S 3/042* | (2006.01) | |
| *H01S 3/02* | (2006.01) | |
| *H01S 3/06* | (2006.01) | |

(52) U.S. Cl.
CPC .............. *H01S 3/0407* (2013.01); *H01S 3/027* (2013.01); *H01S 3/042* (2013.01); *H01S 3/0604* (2013.01)

(58) Field of Classification Search
CPC ..... H01S 3/0346; H01S 3/041; H01S 3/0402; H01S 3/0404; H01S 3/0405; H01S 3/0407; H01S 3/0408; H01S 3/042; H01S 5/0243; H01S 5/02476

USPC ....................................................... 372/34–36
See application file for complete search history.

(56) References Cited

U.S. PATENT DOCUMENTS

| | | | | |
|---|---|---|---|---|
| 3,764,935 | A * | 10/1973 | Iorizzo et al. ................... 372/72 |
| 4,336,691 | A * | 6/1982 | Burstein et al. ................... 62/64 |
| 5,932,170 | A * | 8/1999 | Belenkiy ....................... 266/130 |
| 6,339,605 | B1 | 1/2002 | Vetrovec |
| 6,611,540 | B1 * | 8/2003 | Mueller ......................... 372/35 |
| 6,810,060 | B2 * | 10/2004 | Vetrovec ........................ 372/68 |
| 7,406,109 | B2 | 7/2008 | Daffer et al. |
| 2002/0097769 | A1 | 7/2002 | Vetrovec |
| 2006/0088067 | A1 | 4/2006 | Vetrovec et al. |

FOREIGN PATENT DOCUMENTS

CN          202936521     *  5/2013    ............. C30B 25/00

* cited by examiner

*Primary Examiner* — Tod T Van Roy
*Assistant Examiner* — Vu A Vu
(74) *Attorney, Agent, or Firm* — St. Onge Steward Johnston & Reens LLC

(57) ABSTRACT

A crystal laser including a doped crystal, and a system for cooling the crystal. This cooling system includes: a support including a first and a second surfaces; a device for fastening the crystal to the first surface of the support to form a tight cavity between a first surface of the crystal and the first surface of the support; a circuit for supplying the tight cavity with a liquefied gas; and a device for cooling the second surface of the support.

12 Claims, 3 Drawing Sheets

CRYSTAL LASER COMPRISING A SYSTEM FOR COOLING THE CRYSTAL WITH A FLUID

FIELD OF THE INVENTION

The invention relates to crystal lasers, and more particularly to the cooling of the crystal of such lasers.

BACKGROUND OF THE INVENTION

As known per se, a crystal laser comprises an optical cavity having a doped crystal housed therein, usually in the form of a bar, used as an amplifying medium under the effect of an optical pumping.

A high-power laser generally implies a significant heating of the crystal due to the low efficiency of the optical pumping. Now, for certain applications, such as for example X-ray imaging, it is necessary to have as temperature-stable an amplification as possible. Further, it can be observed that the optical pumping efficiency is optimal when the crystal temperature is in the range from 90 K to 200 K, which temperature range is difficult to reach without taking specific precautions relative to the crystal temperature.

Thereby, systems for cooling the crystal of a laser have been considered.

According to a first technique, the crystal bar is cut into segments and a cold gas is circulated between the bar segments. Such a solution can only be envisaged for very large lasers due to the size of the cooling system.

According to a second technique, the crystal is maintained in contact with a cooled support. Now, the crystal is held on the support by means of glue, of grease, or of indium, that is, a material which has a large thermal expansion coefficient difference with the crystal usually used in a laser. Under the effect of the crystal heating caused by the optical pumping, large expansion differences between the crystal and the material used to maintain it can be observed, such expansion differences ending up weakening the holding material and causing the separation of the crystal from the support, and thus causing in the end a malfunction of the cooling system.

SUMMARY OF THE INVENTION

The present invention aims at providing a laser crystal cooling system which guarantees a contact between the crystal and the cooling support during the crystal deformation with no alteration of the cooling system.

For this purpose, the invention aims at a crystal layer comprising a doped crystal, and at a system for cooling the crystal. According to the invention, the cooling system comprises:
- a support comprising a first and a second surfaces;
- a device for fastening the crystal bar to the first surface of the support to form a tight cavity between a first surface of the crystal and the first surface of the support;
- a circuit for supplying the tight cavity with a liquefied gas; and
- a device for cooling the second surface of the support.

In other words, the contact between the crystal and the cooled support is achieved by means of a fluid film under pressure which efficiently compensates for the crystal expansion under the effect of its heating. Particularly, the liquefied gas has a significant pressure which ensures a permanent contact of the fluid film with the crystal and the cooled support. Further, the fluid film defining a "resilient" joint, it is not degraded when the crystal deforms, so that the system remains efficient even in case of repeated deformations thereof.

According to an embodiment, the fastening device comprises:
- an element housing the crystal bar at a distance from the first surface of the support and surrounding a second surface of the crystal bar; and
- a flexible joint housed between the second surface of the crystal and the element housing it, the joint being capable of deforming under the effect of a bending of the crystal on the second surface of the crystal.

In other words, the flexible joint, for example, a "piston" joint, leaves the crystal free to bend under the effect of the optical pumping, which limits the mechanical fatigue of the bar and limits optical aberrations of the laser.

According to an embodiment, the gas pressure is selected so that the liquefied gas remains liquid in a temperature range between 70 K and 200 K, such a temperature range corresponding to the privileged operating range of a crystal laser. Advantageously, the liquefied gas is selected to remain liquid over a wide temperature range, advantageously, over more than 100 K, particularly over the range from 90 K to 200 K. Since it is liquid over a wide temperature range, it is possible to adjust the crystal temperature by cooling without having to modify the properties of the liquefied gas.

According to an embodiment, the gas comprised in the liquefied gas is n sub-saturation. Particularly, the circuit for supplying the cavity is capable of controlling the gas pressure to define a saturation temperature of said gas greater by at least 50 K than the temperature of the liquefied gas.

It can indeed be observed that the under-saturated liquid enables to efficiently transport the heat that it receives. Thus, for a 55 K difference between the support cooling temperature, and thus at equilibrium with the crystal temperature, and the saturation temperature of the liquefied gas, it is possible to carry off heat flows having a 50-W/cm$^2$ power.

According to an embodiment, the liquefied gas is dioxygen, ethane, or propane, such gases having very low saturation temperatures for pressures exerting no excessive stress on the crystal.

According to an embodiment, the supply circuit comprises a gas storage tank, a duct emerging into the tight cavity and into the tank, and a valve arranged in the duct to control the supplying of the cavity with gas. The gas can thus be stored in its gaseous form for desired pressure and temperature conditions, advantageously at ambient temperature, for example, at 300 K, the cavity being supplied by simple opening of the valve.

According to an embodiment, the cooling device comprises:
- a tight cavity, the second surface of the support forming a surface of said cavity; and a circuit for supplying the cavity with
- a fluid having a temperature in the range from 70 K to 200 K, particularly liquid dinitrogen.

Such an arrangement is compact and has a small number of interfaces between the crystal and the cold source.

According to an embodiment, a third surface of the crystal is free and the laser further comprises:
- a tight enclosure, having the crystal, the support, and the fastening device housed therein;
- a circuit for pumping the enclosure; and
- a window transparent to a radiation used for the optical pumping, formed in a wall of the enclosure facing the third surface of the crystal.

The tight enclosure under low pressure, or "cryostat", thus enables to avoid condensation on the crystal, while allowing the optical pumping of the bar through the window provided for this purpose in front of the crystal.

According to an embodiment, the thickness of the tight cavity between the unbent crystal and the support is smaller than one millimeter, and preferably smaller than 15 micrometers. More particularly, the thickness of the cavity, and thus the distance between the first surface of the crystal and the first surface of the support is selected to be small so as to decrease thermal gradients in the cavity and thus decrease the absolute temperature of the crystal.

BRIEF DESCRIPTION OF THE DRAWINGS

The invention will be better understood on reading of the following description provided as an example only in relation with the accompanying drawings, where.

DETAILED DESCRIPTION OF THE INVENTION

Figure 1:
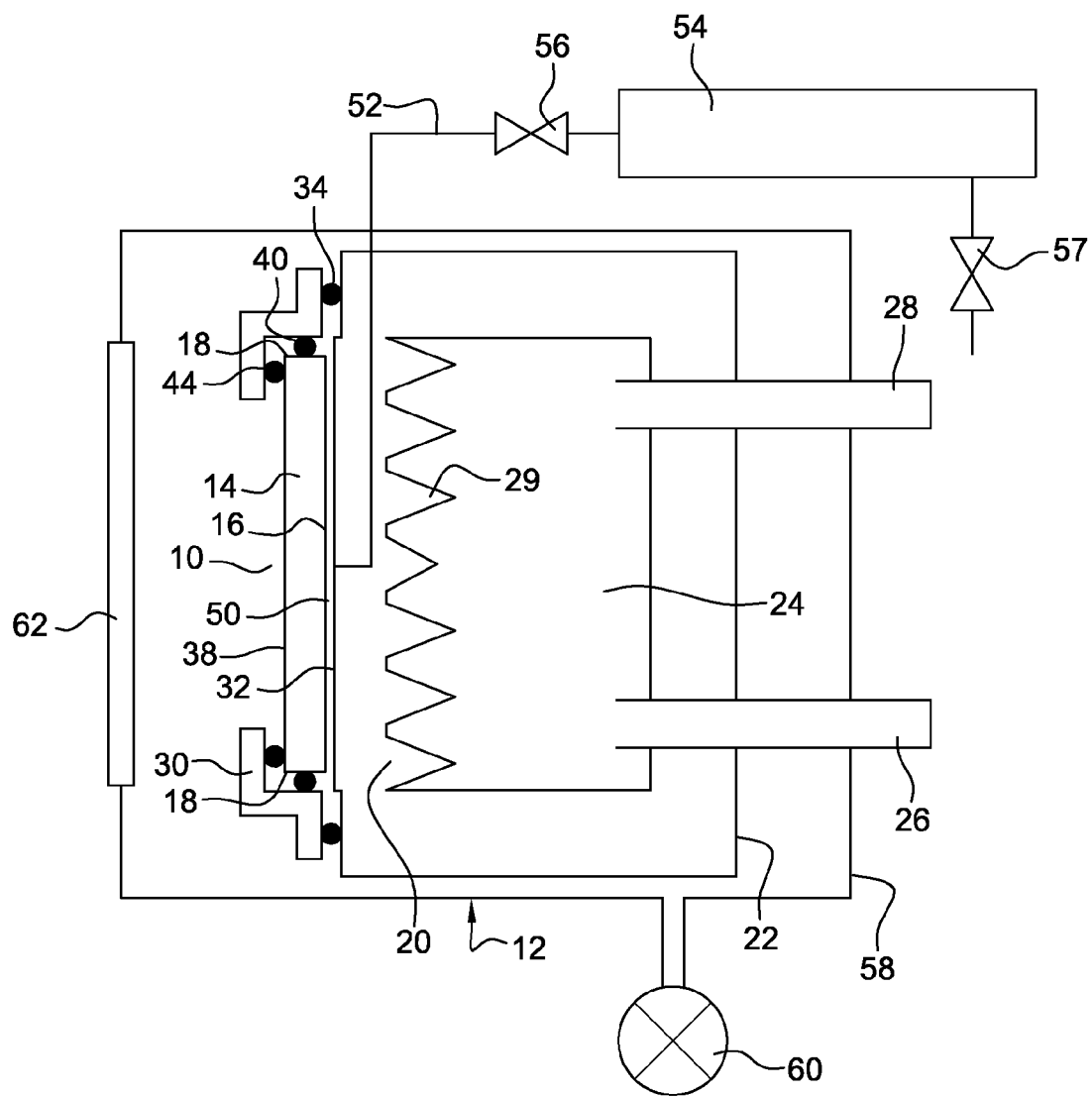
FIG. 1 is a simplified cross-section view of a laser crystal and of its associated cooling system according to the invention.

In FIG. 1, a doped crystal disk 10 of a crystal laser is shown with its cooling system 12. Disk 10 particularly takes the shape of a flat cylinder, for example, with a circular cross-section having a 5-cm diameter, having a first and a second main surfaces 14, 16 delimited by a lateral surface 18.

Cooling system 12 comprises a support 20 forming a wall of a tight cavity 22, having its internal volume 24 in communication with two ducts 26, 28. Duct 26 is connected to a circuit for supplying cooling fluid (not shown), for example, liquid nitrogen, to cool down support 20 in a predetermined temperature range, advantageously the temperature range from 70 K to 200 K for which the efficiency of the optical pumping is high, and the other duct 28 is connected to a pumping circuit (not shown) to discharge the fluid heated by its contact with support 20. Advantageously, the surface internal to cavity 24 of support 20 is provided with fins 29 to increase the area of heat exchange with the fluid present in cavity 22.

System 12 also comprises a ring 30 housing crystal 10 in such a way as to leave a portion 38 of first main surface 14 free, tightly fastened to external surface 32 of support 20 by means of one or a plurality of sealing joints 34, for example, an O-ring.

Crystal 10 is further maintained in ring 30 at a predetermined distance from surface 32 of support 20 by means of one or a plurality of flexible joints 40 arranged between lateral surface 18 of crystal 10 and the ring portion surrounding said surface, and allowing the bending of crystal 10 on its main plane, such as for example one or a plurality of O-rings.

One or a plurality of sealing joints 44 are further arranged, particularly between main surface 14 of crystal 10 and ring 30, to seal cavity 50 formed between second surface 16 of crystal 10 and surface 32 of support 20. Joints 40, 44, are advantageously made of polytetrafluoroethylene (Teflon®), which enables to substantially limit the stress on crystal 10.

Cavity 50 has a sufficient thickness for crystal 10 not to come into contact with support 20 during its bending under the effect of the optical pumping. It is for example known that a crystal having a 5-centimeter diameter is usually submitted to a maximum bending in the range from 5 micrometers to 10 micrometers. The distance separating bar 10 when it is not bent and support 20 is thus advantageously selected to be a little greater than the maximum bending of bar 10, for example, equal to 10 micrometers, so that the liquefied gas takes the shape of a fluid film of small thickness to decrease a thermal gradient across the thickness of the fluid, and thus increase the efficiency of the cooling of crystal 10, and as a consequence to decrease the absolute temperature of crystal 10. The volume of cavity 50 is for example selected to be in the order of one cubic millimeter, particularly in the range from 1 cubic millimeter to 10 cubic millimeters.

A circuit for supplying cavity 50 with a cooling gas under pressure is further provided. The circuit for supplying cavity 50 for example comprises a duct 52 emerging into it, and a tank for storing cooling gas 54 connected to duct 52 through a valve 56 controlling the gas distribution in cavity 50 from tank 54. The tank is for example removable to be able to be replaced and/or is connected to a distribution circuit (not shown) or a tank of larger volume through a valve 57 so that it can be refilled.

The cooling gas advantageously is dioxygen ($O_2$), propane ($C_3H_8$), or ethane ($C_2H_6$), having its pressure in cavity 50 selected so that the liquid cooling gas remains in liquid form over a wide operating temperature range of crystal 10 and thus remains in permanent contact with crystal 10 and support 20, whatever the shape taken by the crystal in said temperature range.

Advantageously, the gas storage pressure in tank 54 is also selected to have a significant sub-saturation state, as will be explained in further detail hereafter. It should be noted that the gas remains in the gaseous state in tank 54 according to the pressure and to the temperature thereof.

Advantageously, crystal 10, cavity 22, and the elements for holding bar 10 on support 20, and optionally tank 54 and valve 56, are arranged in a tight enclosure 58 associated with a circuit 60 for pumping its internal volume, or "cryostat", to avoid condensation phenomena on crystal 10. A transparent window 62 is then formed in a wall of enclosure 58 in front of free surface 14 of crystal 10 to be able to illuminate crystal 10 in order to implement an optical pumping.

An example of operation of a laser equipped with the elements just described is the following. In a first step, when the optical pumping of the laser is not activated, enclosure 58 is placed under vacuum. Once the equilibrium state has been reached in enclosure 58, at a second step, the liquid for cooling support 20 is circulated in cavity 22 to set the temperature of support 20 on a predetermined operating temperature of the laser operating temperature range, and particularly a temperature in the range from 70 K and 200 K.

In a third step, implemented, for example, once the temperature of support 20 has settled, valve 56 is opened to fill cavity 50 with the gas stored in tank 54. The latter liquefies under the effect of the temperature in cavity 50.

Once cavity 50 has been filled with liquefied gas and the temperature thereof settles, in a fourth step, the optical pumping of crystal 10 through window 62 is implemented. The heat generated by crystal 10 under the effect of the pumping is then carried off by the liquefied gas of cavity 50 towards cooled support 20, and is then transferred to the cooling fluid circulating in cavity 22. Further, cavity 50 being connected to the tank through valve 56 which has remained open, the pressure of the liquefied gas in the cavity remains substantially constant. The crystal temperature is thus regulated around the desired operating temperature.

Finally, in a fifth step implemented once the laser has been deactivated, enclosure 58 is heated and the vacuum is broken, valve 56 is closed, and the tank is changed or refilled via valve 57.

The selection of the characteristics of the liquefied gas of cavity 50 will now be described.

The pressure of the liquefied gas in cavity 50 is selected to guarantee that the liquefied gas remains in liquid form in an operating temperature range of crystal 10, for example, a range of at least 10 K around the operating temperature desired for crystal 10, and so that the liquefied gas is in permanent contact with bar 10 and support 20.

Advantageously, the pressure is also selected to be smaller than or equal to 2 or 3 bars in order not to apply a mechanical stress capable of damaging crystal bar 10.

The pressure of the liquefied gas is also selected so that the latter is sub-saturated with gas. As known per se, the heat flow transferred by a fluid increases along with its subsaturation. Further, when the liquid is not in the presence of its gas, the sub-saturation depends on the difference between the temperature of the fluid and the saturation temperature of the fluid, and the saturation temperature depends on the pressure of the fluid. Thus, when the fluid temperature is smaller than the saturation temperature, the fluid is sub-saturated, which sub-saturation increases as the fluid temperature draws away from the saturation temperature, and thus as the pressure increases.

Preferably, the liquefied gas pressure in cavity 50 is selected so that in steady state, the temperature of the liquefied gas, and thus the temperature of support 20 and of bar 10, is smaller by at least 30 K than the saturation temperature, and preferably smaller than 50 K. Particularly, a 55-K difference enables to efficiently carry off with ethane heat flows of 50 W/cm$^2$. The selection of this temperature difference is particularly dictated by the amount of heat to be carried off.

Figure 2:
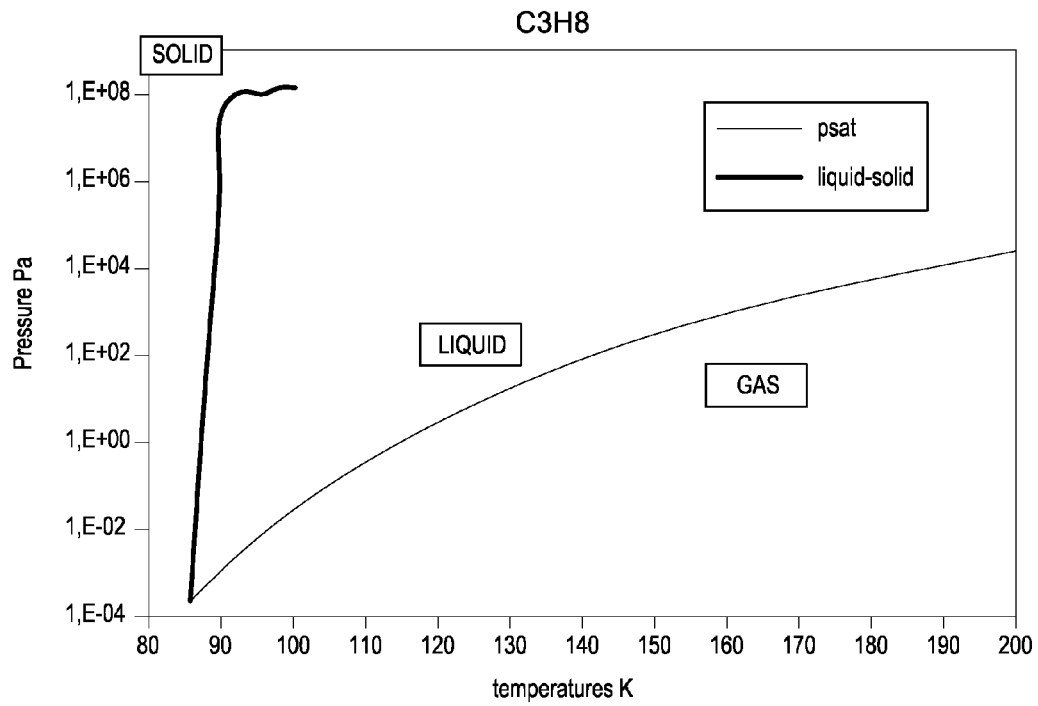
FIGS. 2 to 4 respectively illustrate the phase diagrams of propane, ethane, and dioxygen.
Figure 3:
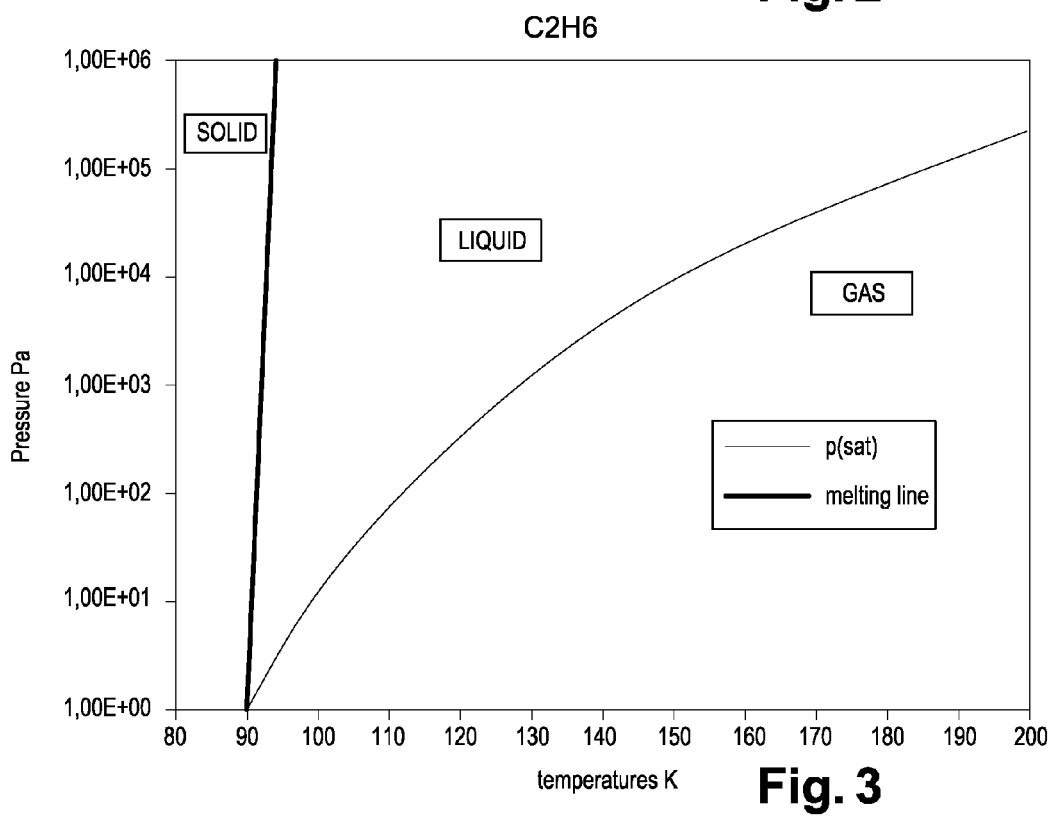
Figure 4:
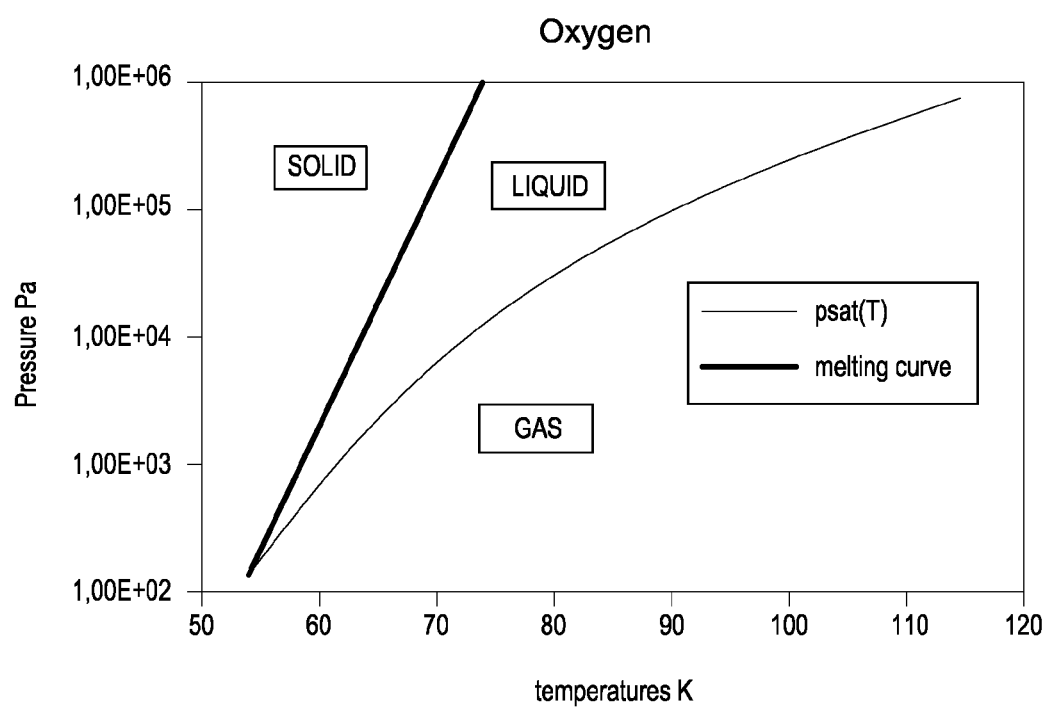

The saturation temperature being linked to the fluid pressure, as for example illustrated in the phase diagrams of FIGS. 2, 3, and 4 respectively of propane, ethane, and dioxygen, it is easy to deduce the appropriate pressure according to the desired temperature difference.

For example, for ethane, if a difference between the operating temperature, and thus the liquefied ethane temperature, and the saturation temperature thereof equal to 35 K is desired, it is possible to select an operating temperature equal to 95 K and a 1,000-Pa, pressure which corresponds to a 130-K saturation temperature. Similarly, if a 55-K difference is desired, it is possible to select an operating temperature of 95 K and a pressure of 10,000 Pa, which corresponds to a 150-K ethane saturation temperature.

Oxygen is preferably used for operating temperatures of crystal 10 in the range from 70 K to 80 K.

Ethane and propane are preferred for operating temperatures of crystal 10 greater than 90 K, and preferably 95 K, such liquefied gases having a strong sub-saturation up to 200 K for a 10,000-Pa pressure for ethane and a 100,000-Pa pressure for propane. One or the other of these gases may be selected according to the tank bulk and/or to the stress applied by the liquefied gas to the crystal bar, particularly the deformation to which the bar may be submitted due to the exerted pressure.

Storage tank 54 is housed outside of the cooling system, and thus at ambient temperature, for example, 300 K. The pressure in the tank is selected to be that desired in cavity 50. However, due to the higher temperature, tank 54 thus has a greater volume which is selected to ascertain that the liquefied gas totally fills cavity 50.

Advantageously, the tank comprises, for security reasons, more gas than necessary to fill cavity 50 and thus has an additional security volume. Advantageously, the tank volume corresponds to twice the amount of liquefied gas in cavity 50.

For example, a tank volume of 200 cm$^3$ of propane at 300 K enables to obtain 75 cm$^3$ of liquid propane at 5,000 Pa.

A crystal in the form of a disk has been described. Of course, other crystal shapes are possible, such as for example a bar.

What is claimed is:

1. A crystal laser comprising a doped crystal having first and second faces opposite to each other and a system for cooling the crystal, wherein the cooling system comprises:
    a support comprising a first surface and a second surface;
    a device for fastening the doped crystal to the first surface of the support to form a tight cavity between the first face of the doped crystal and the first surface of the support, said cavity extending substantially along an entirety of the first face of the doped crystal;
    a circuit for supplying the tight cavity with a liquefied gas; and
    a device for cooling the second surface of the support.

2. The crystal laser of claim 1, wherein the fastening device comprises:
    an element housing the crystal at a distance from the first surface of the support and surrounding a second surface of the crystal; and
    a flexible joint housed between the second surface of the crystal and the element housing the crystal, the joint being capable of deforming under the effect of a bending of the crystal on the second surface of the crystal.

3. The crystal laser of claim 1, wherein the liquefied gas pressure is selected so that the liquefied gas remains liquid in a temperature range such that the saturation pressure is smaller than 2 bars.

4. The crystal laser of claim 1, wherein the gas comprised in the liquefied gas is in sub-saturation.

5. The crystal laser of claim 4, wherein the circuit for supplying the cavity is capable of controlling the liquefied gas pressure to define a saturation temperature of said gas greater by at least 50 K than the temperature of the liquefied gas.

6. The crystal laser of claim 1, wherein the liquefied gas is dioxygen, ethane, or propane.

7. The crystal laser of claim 1, wherein the supply circuit comprises a gas storage tank, a duct emerging into the tight cavity and into the tank, and a valve arranged in the duct to control the supplying of the cavity with gas.

8. The crystal laser of claim 1, wherein the cooling device comprises:
    a tight cavity, the second surface of the support forming a surface of said cavity; and
    a circuit for supplying the cavity with a fluid having a temperature in the range from 70 K to 200 K.

9. The crystal laser of claim 8, wherein the fluid is liquid dinitrogen.

10. The crystal laser of claim 1, wherein a third surface of the crystal is free, and wherein the laser further comprises:
    a tight enclosure, having the crystal, the support, and the fastening device housed therein;
    a circuit for pumping the enclosure; and
    a window transparent to a radiation used for the optical pumping, formed in a wall of the enclosure facing the third surface of the crystal.

11. The crystal laser of claim 1, wherein the thickness of the tight cavity between the crystal and the support is smaller than one millimeter.

12. The crystal laser of claim 1, wherein the thickness of the tight cavity between the crystal and the support is smaller than 15 micrometers.

* * * * *